(12) United States Patent
Gammel et al.

(10) Patent No.: US 6,813,695 B2
(45) Date of Patent: Nov. 2, 2004

(54) MEMORY ACCESS METHOD AND CIRCUIT CONFIGURATION

(75) Inventors: Berndt Gammel, Marktschwaben (DE); Michael Smola, München (DE)

(73) Assignee: Infineon Technologies AG, Munich (DE)

( * ) Notice: Subject to any disclaimer, the term of this patent is extended or adjusted under 35 U.S.C. 154(b) by 284 days.

(21) Appl. No.: 10/195,602

(22) Filed: Jul. 11, 2002

(65) Prior Publication Data

US 2002/0199112 A1 Dec. 26, 2002

Related U.S. Application Data

(63) Continuation of application No. PCT/EP00/13134, filed on Dec. 22, 2000.

(30) Foreign Application Priority Data

Jan. 11, 2000 (EP) .............................................. 00100508

(51) Int. Cl.[7] ............................................. G06F 12/00
(52) U.S. Cl. ...................... 711/167; 711/163; 713/324; 380/252; 326/8
(58) Field of Search ......................... 380/252; 711/167, 711/163; 713/324; 326/8

(56) References Cited

U.S. PATENT DOCUMENTS

| | | |
|---|---|---|
| 4,932,053 A | 6/1990 | Fruhauf et al. |
| 5,500,601 A | 3/1996 | Lisart et al. |
| 5,765,194 A * | 6/1998 | McBride ...................... 711/138 |
| 5,812,662 A * | 9/1998 | Hsu et al. ...................... 705/55 |
| 5,860,106 A * | 1/1999 | Domen et al. .............. 713/324 |

OTHER PUBLICATIONS

Tanimoto et al. US PGPUB 2001/0016910 "IC Card and Microprocessor" Aug. 23, 2001.*

Chari et al. "Torwards Sound Approaches to Counteract Power–Analysis Attacks", Advances in Cryptology Proceedings of Crypto'99 pp 398–412.*

Benini et al. "Energy–Aware Design Techniques for Differential Power Analysis Protection", Design Automation Conference, Jun. 2–6, 2003, p. 36–41 ☐ ☐.*

* cited by examiner

Primary Examiner—Mano Padmanabhan
Assistant Examiner—Paul A Baker
(74) Attorney, Agent, or Firm—Laurence A. Greenberg; Werner H. Stemer; Ralph E. Locher

(57) ABSTRACT

A cache memory serves for accelerating accesses to an external memory of a microprocessor. Instead of an actually occurring hit event, a cache miss is signaled to the microprocessor. The reversal is randomly controlled. This disguises the current profile of cache hit and miss events, which enhances the security against statistical attack techniques based on the evaluation of the current profile.

8 Claims, 1 Drawing Sheet

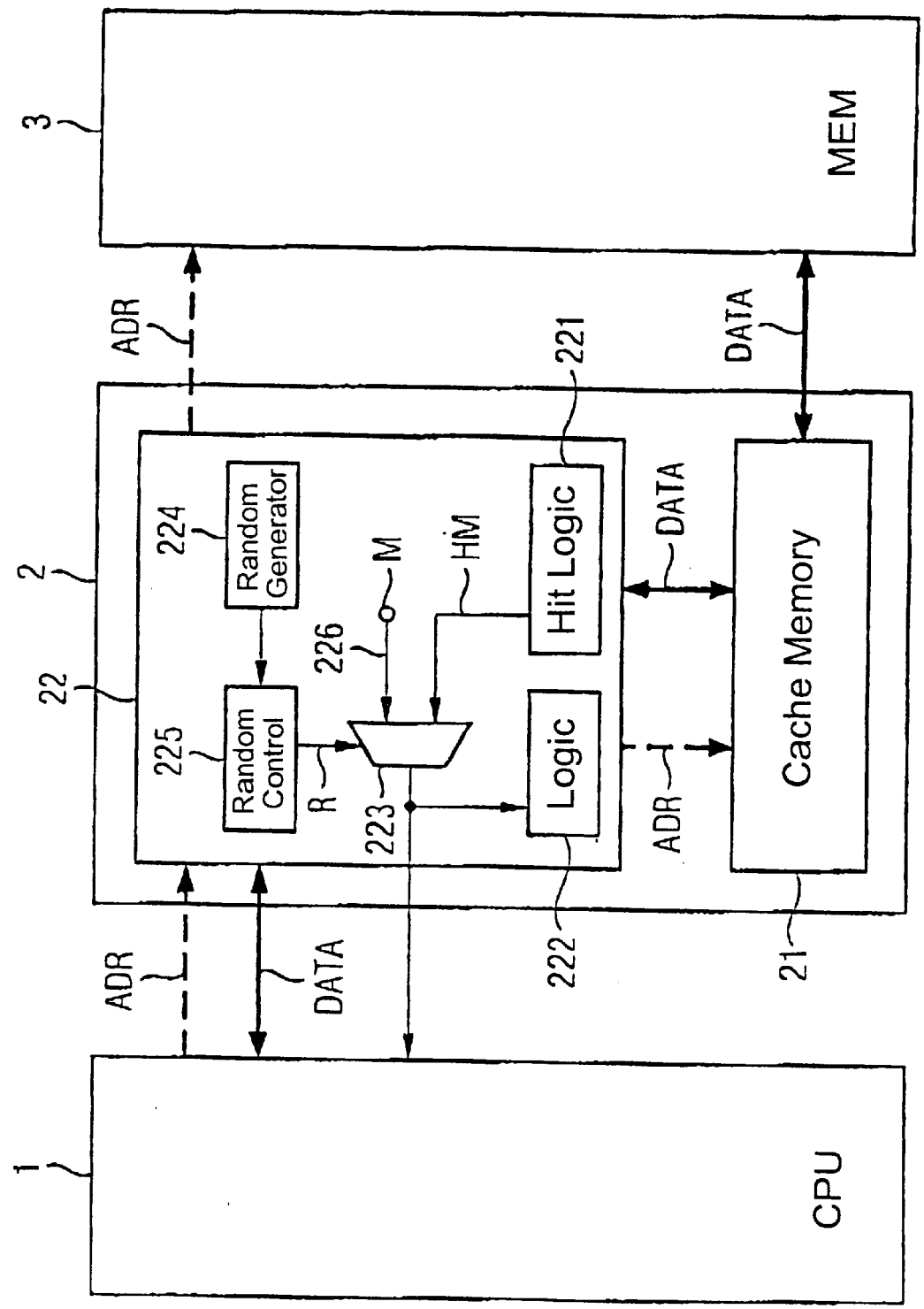

MEMORY ACCESS METHOD AND CIRCUIT CONFIGURATION

CROSS-REFERENCE TO RELATED APPLICATION

This application is a continuation of copending International Application No. PCT/EP00/13134, filed Dec. 22, 2000, which designated the United States and which was not published in English.

BACKGROUND OF THE INVENTION

1. Field of the Invention

The invention relates to a method for accessing a memory by a microprocessor in which a cache memory is provided in which portions of the contents of the memory can be buffered. The microprocessor requests a stored data value. Then the system ascertains whether or not the requested stored data value is contained in the cache memory. If the data value is not contained in the cache memory, the data value is read from the memory. A control signal is generated which, if the data value is contained in the cache memory, reads the data value either from the cache memory or from the memory, in dependence upon the control signal.

The invention also relates to a circuit configuration for carrying out such a method.

Microprocessor systems require a memory in order to permanently or temporarily store data or programs that are to be processed. In the running of the program, the microprocessor accesses the memory in order to load currently required program components. The memory is typically arranged next to the microprocessor as a separate external circuit block in an integrated semiconductor chip. Accesses of the external memory are therefore relatively slow.

So-called cache memories are utilized to accelerate memory accesses. They serve for avoiding latency times when the external memory is accessed, in that frequently required data or instructions are buffered in the cache memory. The caches are smaller than the external memories and are wired so that they respond rapidly to a request. Cache memories can be integrated on the same chip with the microprocessor. Both read and write accesses are handled by the cache.

A read request to the memory by the microprocessor with the aid of the external memory and a cache memory proceeds as follows: First, whether the requested item of data is contained in the cache memory is checked. If it is ascertained that the data item is not buffered in the cache (known as a cache miss), the data item is loaded from the slower external memory into the cache and thereby made available to the microprocessor. If the data item is contained in the cache memory (known as a cache hit), it is immediately read to the microprocessor and processed by same.

Microprocessors are utilized in security systems such as chip cards, among other applications. There, the microprocessor serves, among other functions, for encrypting the data traffic between the chip card and a read device, so that sufficient security against fraudulent attacks aimed at spying out restricted information is guaranteed. One type of attack consists in measuring the characteristic of the power consumption of the microprocessor. Inferences about the program sequence can be drawn from the characteristic current profile. Cache miss and cache hit events can be pinpointed with the aid of the current profile. From these, it is possible to deduce the coding and decoding algorithm that is being utilized, on the basis of the number and position of utilized memory accesses; it would then be possible to draw further inferences about the specific program sequence, and thereby to determine, with the aid of the current profile, trigger points at which other measuring procedures attach.

The current profile differs for a cache hit and a cache miss. While data from the cache memory are read immediately to the microprocessor in a cache hit, in a cache miss some time passes while the cache memory is loaded from the external memory. The current consumption is therefore smaller in the initial phase in a cache miss than in a cache hit. The current consumption in a cache miss rises during the loading of the cache memory owing to the numerous switching processes in the chip during loading. The current consumption can be measured by way of the external terminal pins of the integrated circuit or the current supply terminals of the chip card.

A data access with a cache miss thus lasts relatively long, and the loading operation brings about a relatively large current consumption of the central unit of the microprocessor. The result of cache hit and cache miss events is that the central unit must wait for different lengths of time for the data to become available. The wait process has a characteristically low power consumption of the central unit. The total power consumption in a cache miss is greater than in a cache hit. From this it is possible, by means of statistical evaluation methods utilizing correlations with the activity pattern of the current profile, to draw inferences about the processing steps within the microprocessor and the data being processed. The application of such conventional microprocessors in systems which process secret, security-related information is therefore problematic.

U.S. Pat. No. 5,765,194 describes a cache memory in which a cache miss is signaled instead of a cache hit. This prevents possible access collisions with respect to the cache memory. Given a cache hit, a deterministic control switches over to a cache miss.

U.S. Pat. No. 0.4,932,053 describes a random access to dummy memory cells for the purpose of disguising the current profile. U.S. Pat. No. 5,500,601 generally relates to the problem of the detectability of the current profile by monitoring.

SUMMARY OF THE INVENTION

It is accordingly an object of the invention to provide a method for accessing a memory by a microprocessor with the aid of a cache memory which overcomes the above-mentioned disadvantages of the heretofore-known devices and methods of this general type and which further improves the security against monitoring. A further object is to lay out a circuit configuration which guarantees better security against monitoring.

With the foregoing and other objects in view there is provided, in accordance with the invention, a method of accessing a memory with a microprocessor and having a cache memory wherein portions of memory contents of the memory can be intermediately stored, the method which comprises:

upon receiving a request from the microprocessor for a stored data value, determining whether the requested stored data value is contained in the cache memory;

if the data value is not contained in the cache memory, reading the data value from the memory;

generating a control signal in random fashion and, if the data value is contained in the cache memory, reading the data value either from the cache memory or from the memory in dependence on the control signal.

In other words, the objects laid out in connection with the method are achieved by a method for the accessing of a memory by a microprocessor with a cache memory in which portions of the contents of the memory can be temporarily stored. The microprocessor requests a stored data value and, whether the requested value is contained in the cache memory is ascertained. It is it not, the data value is read from the memory. A control signal is generated, which, if the data value is contained in the cache, reads the value either from the cache memory or from the memory, depending on the control signal. The control signal is a random signal, which is randomly generated.

The object in connection with the circuit configuration is achieved by a circuit configuration comprising: a central processing unit, a memory, a cache memory, and a control device which is connected to the CPU and the cache memory; whereby the control device contains: a random generator for generating a random signal, a device for ascertaining whether or not a data value that has been requested by the CPU is contained in the cache memory, a terminal for releasing a signal indicating that the data value is not contained in the cache, and a changeover device, which is controllable by the random generator, and which is connected on the input side to the terminal and the device for making the determination and coupled on the output side with the CPU for the purpose of a read operation is controllable either from the memory or from the cache in dependence upon a signal at the changeover device on the output side.

One or more cache memories can be provided. The described circuit configuration and method can be advantageously applied with any cache memory. Said control device can either be shared by all caches as a central device or can be present in multiple form and individually allocated to single caches. Caches for data that are to be processed, caches for instructions, and caches for data and instructions together are all known under the common heading unified caches. The term data value encompasses both data that are to be processed and instructions.

In the inventive method and circuit configuration, the correlation between current signatures emerging with cache hits and misses and the program sequence is disguised. To accomplish this, the invention provides a control signal by means of which an additional intervention into the memory access control is possible. This way, when a cache hit is detected, the memory access can nevertheless be handled as a cache miss. For all practical purposes, cache hits are suitably replaced by cache misses. Besides its dependency on the cache contents and the access address, intervention in the cache control logic also occurs by means of the control signal for the purpose of the additional insertion of cache misses. The control signal is controlled by parameters other than the hit rate for cache hits. As a result, the externally measurable current profile of the microprocessor and the sequence of cache misses and cache hits no longer correspond to the program sequence. This makes it substantially more difficult to deduce the program sequence by measuring the current profile.

The control signal is generated with the aid of random patterns. The utilization of random patterns is sufficiently known. Numeric series which are generated in such a way that they are physically random or pseudo-random are suitable.

The random series is generated by a random number that is outputted by a random generator or random number generator. It is advantageous to additionally modify the randomness. For instance, the cache control can log the number of cache misses and hits within a definite period of time and set the additional cache miss events so that, averaged over the period, a uniform distribution of cache misses and cache hits corresponding to a prescribed value sets in. Additional cache misses are generated in dependence on this statistic. The cache miss rate is dynamically adjusted according to the statistic, so that a fixed ratio between the number of cache misses and the number of cache hits within a defined time interval is achieved in the steady state. It is then no longer possible to draw inferences about the program sequence of the microprocessor on the basis of the sequence of cache miss and cache hit events.

A cache miss leads to a large workload on the microprocessor. The computing power of the system then drops. It is therefore expedient when cache misses are additionally generated precisely when the load on the microprocessor is small. Given a high load on the microprocessor, the cache miss rate is reduced. The insertion of additional cache misses is expediently performed in dependence upon the software to be executed. In this embodiment, an application-specific compromise between computing power and security can be reached by means of the software.

Other features which are considered as characteristic for the invention are set forth in the appended claims.

Although the invention is illustrated and described herein as embodied in a memory access method and circuit configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a block diagram of a microprocessor with an external memory.

DESCRIPTION OF THE PREFERRED EMBODIMENTS

Referring now to the sole FIGURE of the drawing in detail there is shown a microprocessor with a CPU 1 and a cache device 2. The CPU and the cache device are integrated on the same semiconductor chip. The cache device comprises the memory cell field 21 and the cache control device 22. The microprocessor is connected to an external memory 3, which can be realized on an additional semiconductor chip or integrated on the same chip. The represented microprocessor system can be arranged in a chip card which communicates with a read device, for instance an automated teller machine. The microprocessor computes the coding and decoding of the data traffic between the read device and the chip card. During the program that is run by the CPU 1, data, program instructions and address or page access tables of virtual memory systems are fetched from the memory. This information is deposited in the external memory 3. Because accesses to the external memory are relatively long processes, a portion of the data of the memory 3 is temporarily buffered in the cache memory 21. The cache memory 2 is wired in such a way that it can provide the requested data to the CPU faster than the external memory 3. The interaction between the cache memory 21 and the external memory 3 is handled by the cache control device 22, known as a cache controller.

In a read operation of the CPU 1, the address ADR is transmitted to the cache controller 22. The cache controller 22 checks the contents of the cache memory 21 as to whether the requested information is buffered there. To accomplish this, the addresses ADR are transferred to the memory cell field 21. A hit logic unit 221 ascertains whether the requested item of data is contained in the cache memory 21. An output signal HM of the hit logic 221 indicates the result of this determination. The signal HM is transferred to the CPU 1. The status of the signal HM indicates to the CPU 1 whether the requested data are located in the cache memory 21 or the external memory 3. Depending on this, the data value is loaded either directly from the cache memory 21 or from the external memory 3.

When the data are in the cache memory 21 (cache hit), they are transferred to the cache controller 22 as data signal DATA via the data bus, and then routed by the cache controller to the CPU 1. When the requested data are not in the cache memory 21 (cache miss), the access to the external memory 3 takes longer. For this, the addresses ADR are transferred to the external memory 3 by the cache controller 22. The requested data are transferred to the cache memory cell field 21 and buffered there, so that they are there for another access and can be more rapidly retrieved than in an access from the external memory 3. The data DATA are then routed to the CPU 1 by way of the cache controller 22. Depending on which access control method is run by the cache controller 22, not only the requested data itself, but also a suitable environment for these data, is buffered in the cache memory cell field 21. The control of this fill operation is performed by the fill logic device 222.

Given a cache miss, a certain period of time is required for searching through the cache memory cell field 21 and ascertaining that the requested data are not in the memory cell field 21. Additional time expires until the external memory 3 is ready for a data read. During this time, the power consumption is low. Afterward, however, a number of switching operations are required in order to read the data that have been made available by the external memory 3 into the cache memory 21 and to ready the CPU 1. The power consumption is high, accordingly. Given a cache hit, the requested data are available relatively promptly, so that the power consumption is high immediately after the request is made, but persists only for a short time.

In order to make it impossible to draw inferences about the program run on the basis of the externally measurable power consumption, additional cache miss events are inserted given a request to the memory. Even when the hit logic 221 determines that a cache hit is present, the request is handled as if a cache miss had occurred. This means that the external memory 3 is accessed, and the cache memory 21 is loaded. The characteristic current profile for a cache miss emerges instead of the current profile for the cache hit. For this purpose, a changeover device or multiplexer 223 is provided in the cache controller 22, whose changeover signal R is provided by a random generator 224. The changeover device 223 switches between the signal HM from the hit logic and a signal M which indicates a cache miss. This means that, given a memory access, a cache miss event is transmitted to the CPU 1 in dependence upon the bit of the changeover signal R, which is randomly provided by random generator 224. Even if the hit logic 221 has detected a cache hit, a cache miss is indicated to the CPU 1 when the changeover device 223 has been switched to the signal M.

A random control 225 is advantageously interposed between the random generator 224 and the changeover device 223. The random control 225 modifies the random signal which is generated by the random generator 224 in an advantageous way.

In one embodiment, the random control 225 provides for the achievement of a uniform distribution between cache misses and cache hits within a given time period. To accomplish this, the random control 225 creates a statistic in which the number of cache miss events and cache hit events are logged. Enough additional cache miss accesses are then inserted, that in the given time period the number of cache hits and the number of cache misses correspond to respective prescribed values. The prescribed values which are set for the number of cache misses and cache hits can be equal or different. Considered over the operating time, an outwardly uniform distribution of cache hits and cache misses emerges. Enough additional cache misses must be inserted, that the respective prescribed values for the number of cache misses and cache hits per a given time interval set in. It then becomes impossible to draw inferences about the control flow of the software/firmware of the microprocessor from the current profile. The insertion of additional cache misses is also random in this embodiment as well.

In another embodiment, the random control 225 effectuates an insertion of additional cache misses in dependence upon the load on the CPU 1. To accomplish this, a signal is generated in the CPU 1, which is fed to the random control 225 and which indicates the instantaneous load level of the CPU 1. When the CPU 1 is under a small load, the cache miss rate (i.e. the number of needed and additional cache miss events per given time interval), is higher. On the other hand, given a high load, the computing power must not be further loaded by slow memory accesses, and so the cache miss rate is reduced. In either case, additional cache miss events—i.e. those which are executed despite the determination of a cache hit by the hit logic 221—are inserted randomly by the random generator 224. Given a low cache miss rate, the safety from interception by means of current profile measuring is reduced, but on the other hand there is sufficiently high computing power available to the microprocessor system for executing the application being run. A compromise between computing power and security which is adapted to the application is individually configured by means of the software.

Although the foregoing exemplary embodiments have been described in connection with a read access, the invention can also be expanded to a write access that is handled via the cache memory. In a writing of data into the external memory 3, the first step is to check whether the data that are to be written are already present in the cache memory 21. Given a cache hit, the processor need not transfer the data separately to the external memory 3. Rather, this is taken over by the cache control 22 with the aid of the write data stored in the cache memory 21. Here, as well, a cache miss is indicated to the CPU 1 instead of an actual cache hit, in accordance with the foregoing embodiments. Here, too, the random signal that is generated by random generator 224 can be modified by the random control 225. In write accesses, cache misses and cache hits in a given time period can be logged and set as an averaged uniform distribution across the given time period according to a prescribed value, whereby a corresponding number of additional cache misses are inserted. On the other hand, it is possible to reduce the cache miss rate given high load and to increase it given low load, according to the computing power of the system.

We claim:

1. A method of accessing a memory with a microprocessor and having a cache memory wherein portions of memory contents of the memory can be intermediately stored, the method which comprises:

upon receiving a request from the microprocessor for a stored data value, determining whether the requested stored data value is contained in the cache memory;

if the data value is not contained in the cache memory, reading the data value from the memory;

generating a control signal in random fashion and, if the data value is contained in the cache memory, reading the data value either from the cache memory or from the memory in dependence on the control signal.

2. The method according to claim 1, which comprises generating a first signal indicating that the data value is contained in the cache memory, generating a second signal indicating that the data value is not contained in the cache memory, and effecting a changeover between the first and second signals in dependence upon the control signal.

3. The method according to claim 1, which comprises detecting a first number of read operations from the cache memory and a second number of read operations from the memory occurring in a given time period; and generating the control signal such that the first and second numbers substantially correspond to respectively prescribed values.

4. The method according to claim 1, which comprises generating a signal representing a measure of a load level of the microprocessor; detecting a number of read operations from the memory in a given time interval; and generating the control signal such that the number of read operations from the memory is lower when the load level indicated by the signal is relatively high than when the load level is relatively low.

5. The method according to claim 1, which comprises, after the data value is read from the memory, writing the data value into the cache memory.

6. A circuit configuration, comprising:

a central processing unit, a memory, and a cache memory;

a control device connected to said central processing unit and to said cache memory, said control device containing:
   a random generator for generating a random signal;
   a device for determining whether or not a data value requested by said central processing unit is contained in said cache memory;
   a terminal for a signal indicating that the data value is not contained in the cache memory; and
   a changeover device connected to and controllable by said random generator, said changeover device having an input connected to said terminal, an input connected to said determining device, and an output coupled with said central processing unit, for reading either from said memory or from said cache memory under control of said changeover device in dependence on a signal carried at said output.

7. The circuit configuration according to claim 6, which further comprises an additional control device connected to said output of and controlled by said changeover device, for writing a data value read from said memory into said cache memory.

8. The circuit configuration according to claim 6, wherein said random generator comprises a control by which the random signal is controllable in dependence upon at least one of a number of times said memory is accessed by said central processing unit and a number of times said cache memory is accessed by said central processing unit.

* * * * *